US012749412B2

(12) United States Patent
Carpenter

(10) Patent No.: US 12,749,412 B2
(45) Date of Patent: Sep. 29, 2026

(54) TREE/POLE CUTTING TRAINING ASSEMBLY AND METHOD

(71) Applicant: North American Training Solutions Inc., Douglas, MA (US)

(72) Inventor: Edgar P. Carpenter, Douglas, MA (US)

(73) Assignee: North American Training Solutions Inc., Medway, MA (US)

( * ) Notice: Subject to any disclaimer, the term of this patent is extended or adjusted under 35 U.S.C. 154(b) by 797 days.

(21) Appl. No.: 18/074,129

(22) Filed: Dec. 2, 2022

(65) Prior Publication Data

US 2023/0177977 A1 Jun. 8, 2023

Related U.S. Application Data

(60) Provisional application No. 63/285,742, filed on Dec. 3, 2021.

(51) Int. Cl.
*G09B 19/24* (2006.01)
*G09B 25/08* (2006.01)

(52) U.S. Cl.
CPC .............. *G09B 19/24* (2013.01); *G09B 25/08* (2013.01)

(58) Field of Classification Search
CPC ................................ G09B 19/24; G09B 25/08
USPC ........................................................ 434/225
See application file for complete search history.

(56) References Cited

U.S. PATENT DOCUMENTS

| | | | | | |
|---|---|---|---|---|---|
| 3,970,834 | A * | 7/1976 | Smith | A47G 33/06 | 362/123 |
| 5,015,510 | A * | 5/1991 | Smith | A47G 33/06 | 211/205 |
| 5,280,871 | A * | 1/1994 | Chuang | A45B 17/00 | 248/516 |
| 5,401,545 | A * | 3/1995 | Hyde | A47G 33/06 | 211/205 |
| 2005/0272569 | A1* | 12/2005 | Haeffer | A63B 69/22 | 482/83 |

FOREIGN PATENT DOCUMENTS

| | | | | |
|---|---|---|---|---|
| ES | 2270729 | B1 * | 5/2008 | B27B 29/00 |

* cited by examiner

*Primary Examiner* — Peter S Vasat
*Assistant Examiner* — Stephen Alvesteffer
(74) *Attorney, Agent, or Firm* — Troutman Pepper Locke LLP; Christopher J. Capelli

(57) ABSTRACT

A tree cutting training assembly and method including an elongated pole member defining a longitudinal axis. The elongated pole member may be unitarily formed or may be formed with separate base and body portions removably coupled to one another via a coupling member. The elongated pole member may include a plurality of removable branch members. A base member is provided that is configured and operable to removably secure a base portion of the elongated pole member to the ground plane, such that the elongate pole member upstands at an angle from the ground plane to facilitate tree/pole felling/cutting training exercises. The base member may be configured to pivot between first and second positions, wherein the first position disposes the secured elongated pole member substantially parallel to a ground plane and the second position disposes the secured elongated pole member at an angle relative to the ground plane.

17 Claims, 10 Drawing Sheets

TREE/POLE CUTTING TRAINING ASSEMBLY AND METHOD

CROSS REFERENCE TO RELATED APPLICATIONS

This application claims priority to U.S. Patent Application Ser. No. 63/285,742 filed Dec. 3, 2021, which is incorporated herein by reference in its entirety.

FIELD OF THE INVENTION

The disclosed embodiments generally relates to tree/pole cutting training apparatus, and more particularly, to a tree/pole cutting training assembly having replaceable components.

BACKGROUND OF THE INVENTION

Cutting/felling trees and/or utility poles is one of the most life-threatening activities any worker can perform, particularly for arboriculture, electric utility and forestry workers. It is critical that a worker tasked with cutting trees and/or utility poles is well trained for assessing the applicable risks and hazards.

There is presently a strong need to provide an environmentally friendly solution to train and assess skills and competencies for tree cutting, particularly for arborists, foresters and utility trade workers. It is important to provide a safe, reliable, and consistent infrastructure for students and workers to learn and practice high-risk skills such as chainsaw cutting, work at height, and rigging operations in a safe and controlled environmental setting independent of the hazards that typically accompany a tree cutting worksite.

Thus, there is presently a strong need to properly train workers in developing skills that reduce variables and mitigate risks associated with chainsaws, tree cutting, and the often high-risk urban environment tree cutting is subject to.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect described is a safe, reliable, and consistent infrastructure for tree cutting students and workers to learn and practice high-risk skills such as chainsaw cutting, work at height, and rigging operations in a safe and controlled setting independent of the hazards of the typical worksite. In accordance with certain preferred embodiments wood products are preferably utilized for tree cutting training that have been sustainably harvested to replace pieces and parts, such as limbs, the top, and bottom sections, without having to cut down an entire tree each time a student/worker is learning and practicing tree cutting skills.

For instance, the elongated training pole members preferably utilizes (but is not to be understood to be limited to) a 12" diameter Class 1 wooden utility pole. The training pole may preferably be affixed like a cantilevered beam to create the main stem which is used to support and anchor lateral replaceable wooden limbs. The wooden limbs may preferably be connected to the main stem of training pole in a variety of methods (e.g., such as mortis or tenor fit, with wood lags or a threaded rod, or press fit into place). The replaceable limbs may range in size from ½" to 8" in diameter and are preferably sustainably harvested. Additionally, the elongated training pole member of the certain embodiments may have replaceable vertical sections (top, bottom, and other configurations) that a worker can cut apart. It is to be appreciated that utilizing the aforesaid replaceable process enables only the section of the tree/pole where the cuts are made to be replaced without having to replace the entire tree/pole each time, thus different sections of an engineered tree/pole can be readily and safely replaced without having to cut down an entire tree/pole each and every time a worker is trained or performs a skills evaluation. It is to be further appreciated that in accordance with the certain illustrated embodiments, lateral and vertical sections of a training tree/pole can be configured in a range of sizes and wood species to mimic an actual work site/environment.

To achieve these and other advantages and in accordance with the purpose of the illustrated embodiments, in one aspect, a tree/pole cutting training assembly and method is described which includes an elongated pole member defining a longitudinal axis. The elongated pole member may be unitarily formed or may be formed with separate base and body portions removably coupled to one another via a coupling member. The elongated pole member may include a plurality of removable branch members. A base member is provided that is configured and operable to removably secure a base portion of the elongated pole member to the ground plane, such that the elongate pole member upstands at an angle from the ground plane to facilitate tree/pole cutting training exercises. The base member may be configured to pivot between first and second positions, wherein the first position disposes the secured elongated pole member substantially parallel to a ground plane and the second position disposes the secured elongated pole member at an angle relative to the ground plane.

In one illustrated embodiment a tree cutting training assembly is provided that includes an elongated pole member defining a longitudinal axis having a plurality of removable branch members, wherein the elongated pole member has a proximal base portion and a distal top portion. A base member is included which is configured to removably secure to the proximal base portion of the elongated pole member, wherein the base member is configured to pivot between first and second positions, wherein the first position disposes the secured elongated pole member substantially parallel to a ground plane and the second position disposes the secured elongated pole member at an angle relative to the ground plane. The elongated pole member may be fabricated from a wood material chosen to emulate a chosen tree type and/or wherein an outer circumference portion of the elongated pole member is fabricated from a wood material. Additionally, an inner core portion of the elongated pole member may be fabricated from a non-wood material. The elongated pole member may consist of plurality of separate inter-fitting sections disposed along the longitudinal axis of the elongated pole member when fitted together. Each of the removable branch members may be fabricated from a wood material chosen to emulate a chosen tree type, and wherein each of the plurality of removable branch members may extend angularly from a section of the elongated pole member along the longitudinal axis of the elongated pole member, whereby each branch member removably engages with a branch receiving section defined on a portion of the elongated pole member. Each branch receiving section of the elongated pole member may be defined by an aperture formed in the elongated pole member configured to detachably receive an end portion of a removable branch member. The base member may consist of a pole supporting member pivotally coupled to a base plate whereby the pole supporting member pivots at a selectable angle of orientation relative to the base plate to facilitate the first and second positions provided by the base member for a removable secured elongated pole member, wherein the pole supporting member includes a hinge assembly pivotally coupling the pole supporting member to the base plate, and wherein the pole supporting member further includes a locking assembly for locking the pole supporting member in the second position whereby an elongated pole member secured in the supporting member upstands at an adjustable acute angle relative to the ground plane. The pole supporting member may define a wall having a circular circumference whereby the pole supporting member consists of separate interlocking first and second sleeve members each defining an annular wall surface configured to detachably secure about the proximal end portion of the elongated pole member when the first and second sleeve members are locked to one another, wherein the pole supporting member may include a plurality of locking bolts for detachably locking the first and second sleeve members to one another. The base member may include a ground locking assembly for detachably securing the base member to the ground plane, wherein the ground locking assembly may include a plurality of apertures defined in the base plate each being configured to removably receive an elongated anchor bolt for securing the base plate to the ground plane.

In another illustrated embodiment, provided is a pole securing apparatus for pivotally securing an elongated pole member to a ground plane, including a base plate configured to secure to the ground plane and a pole supporting member configured to detachably secure to a proximal base portion of an elongated pole member. The pole supporting member is preferably pivotally coupled to a base plate to have an approximate 90° pivoting orientation relative to the base plate to facilitate selective movement of a secured elongated pole member between first and second positions wherein the first position disposes a detachably secured elongated pole member parallel to the ground plane and the second position disposes a detachably secured elongated pole member at user selected acute angle relative to the ground plane. The pole supporting member further includes a hinge assembly pivotally coupling the pole supporting member to the base plate and may further include a locking assembly for locking the pole supporting member in the second position whereby an elongated pole secured in the supporting member upstands at an approximate 90° angle from the base plate. The pole supporting member may also include a locking assembly for locking the pole supporting member in the second position whereby an elongated pole secured in the supporting member upstands at selectable angle from the base plate. The pole supporting member preferably defines a wall having a circular circumference whereby the pole supporting member consists of separate interlocking first and second sleeve members each defining an annular wall surface configured to detachably secure about a proximal end portion of an elongated pole member when the first and second sleeve members are locked to one another. The pole supporting member may further include a plurality of locking bolts for detachably locking the first and second sleeve members to one another. The base member may include a ground locking assembly for detachably securing the base member to the ground plane. The ground locking assembly may include a plurality of apertures defined in the base plate each being configured to removably receive an elongated anchor bolt for securing the base plate to the ground plane.

In another illustrated embodiment provided is a tree cutting training assembly that includes an elongated pole member defining a longitudinal axis wherein the elongated pole member has a base portion defining a bottom portion of the elongated pole member and a separate elongated body portion defining a top portion of the elongated pole member. Also included is a pole connecting member configured to removably secure to a top portion of the base portion and a bottom portion of the elongated body portion of the elongated pole member such that the base portion and elongated body portion are aligned in a common longitudinal axis. Further included may be an elongate ground support member configured to receive within the ground, wherein the elongate ground support member defines an inner receptacle portion along its longitudinal axis configured to removably receive a bottom end portion of the base portion of the elongated pole member so as to support the elongate pole member to upstand from the ground. The pole connecting member may define a wall having a circular circumference whereby the pole connecting member consists of separate interlocking first and second sleeve members each defining an annular wall surface configured to detachably secure to a top portion of the base portion of the elongate pole member and a bottom portion of the elongate body portion when the first and second sleeve members are locked to one another. The pole connecting member may include a plurality of locking bolts for detachably locking the first and second sleeve members to one another. The base portion and separate elongate body portion of the elongate pole member may be formed of different materials relative to one another. The base portion may be formed of wood and/or wherein the base portion may have a material density different than the material density of the separate elongate body portion.

In another illustrated embodiment, provided is a tree cutting training assembly, including an elongate pole member defining a longitudinal axis wherein the elongate pole member has a base portion and a separate elongate body portion, and a pole connecting member configured to removably secure to a top portion of the base member and a bottom portion of the elongate body portion such that the base portion and elongate body portion are aligned in a common longitudinal axis. Also included is a base member configured to removably secure to a bottom portion of the base portion of the elongate pole member, wherein the base member is configured to pivot between first and second positions, wherein the first position disposes the secured elongate pole member substantially parallel to a ground plane and the second position disposes the secured elongated pole member at an angle relative to the ground plane. Further included may be an elongate sleeve member configured to receive within the ground, wherein the elongate sleeve member defines an inner receptacle portion along its longitudinal axis configured to removably receive a bottom end portion of the base portion of the elongate pole member. The pole connecting member may define a wall having a circular circumference whereby the pole connecting member consists of separate interlocking first and second sleeve members each defining an annular wall surface configured to detachably secure to a top portion of the base portion of the elongate pole member and a bottom portion of the elongate body portion when the first and second sleeve members are locked to one another, and wherein the pole connecting member may include a plurality of locking bolts for detachably locking the first and second sleeve members to one another. The base portion and separate elongate body portion of the elongate pole member may be formed of different materials relative to one another, wherein the base portion may be formed of wood. Also, the base portion may have a material density different than the material density of the separate elongate body portion. The base member may consists of a pole supporting member pivotally coupled to a base plate whereby the pole supporting member pivots at an approximate 90° orientation relative to the base plate to facilitate the first and second positions provided by the base member for a removably secured elongated pole member. The pole supporting member may include a hinge assembly pivotally coupling the pole supporting member to the base plate, wherein the pole supporting member may further include a locking assembly for locking the pole supporting member in the second position whereby an elongate pole member secured in the supporting member upstands at an angle relative to the ground plane, and wherein the angle relative to the ground plane may be user selected. The pole supporting member may define a wall having a circular circumference whereby the pole supporting member consists of separate interlocking first and second sleeve members each defining an annular wall surface configured to detachably secure about the bottom end portion of the base portion of the pole member when the first and second sleeve members are locked to one another. The pole supporting member may include a plurality of locking bolts for detachably locking the first and second sleeve members to one another. The base member may include a ground locking assembly for detachably securing the base member to the ground plane, wherein the ground locking assembly may include a plurality of apertures defined in the base plate each being configured to removably receive an elongated anchor bolt for securing the base plate to the ground plane.

In yet another illustrated embodiment, provided is a tree cutting training assembly, including an elongate pole member defining a longitudinal axis having a plurality of removable branch members, wherein the elongated pole member has a bottom base portion and a top portion, and an elongate ground support member configured to receive within the ground, wherein the elongate ground support member defines an inner receptacle portion along its longitudinal axis configured to removably receive a bottom end portion of the elongate pole member so as to support the elongate pole member to upstand from the ground. Each of the removable branch members may be fabricated from a wood material chosen to emulate a chosen tree type and/or may be fabricated from a material different than the material used to fabricate the elongate pole member. Each of the plurality of removable branch members may extend angularly from a section of the elongate pole member along the longitudinal axis of the elongated pole member, whereby each branch member removably engages with a branch receiving section defined on a portion of the elongate pole member. Each branch receiving section of the elongate pole member may be defined by an aperture formed in the elongate pole member configured to detachably receive an end portion of a removable branch member.

In another illustrated embodiment, provided is a tree cutting training assembly including an elongated pole member defining a longitudinal axis. The elongated pole member has a plurality of separate body members, and a plurality of pole connecting members each configured to detachably secure to an end portion of adjacent separate body members along the longitudinal axis of the elongated pole member. The tree cutting assembly further includes a plurality of support members each configured to support the elongated pole member in a plane that is substantially horizontal to a supporting surface plane. One or more of the separate members may include one or more removable branch members, and wherein one or more of the separate members are formed of different materials relative to one another.

A further illustrated embodiment provides a tree cutting training method, including detachably securing an elongated pole member in a base securing member affixed to a ground plane such that elongated pole member upstands from the ground plane. The elongated pole member preferably includes: 1) a first base portion defining a bottom portion of the elongated pole member wherein a bottom end of the first base portion is detachably secured in the base securing member; and 2) a separate coupled elongated body portion defining a top portion of the elongated pole member wherein a bottom end the elongated body portion is detachably coupled to a top end of the first base portion. The method further includes cutting at least portion of the base portion of the elongated pole member extending from the base securing member, and then preferably decoupling the elongated body portion from the base portion of the pole member after the at least a portion of the base portion was cut. The base portion is then preferably removed from the base securing member after the at least a portion of the base portion was cut. The elongated body portion is then preferably detachably coupled to a second base portion so as to form a new elongated pole member. The method may further include detachably securing the new elongated pole member in the base securing member. Further included may be a plurality of branch members are removably secured to the elongated body portion of the pole member such that after a branch member is cut, it is removed from the elongated body portion and replaced with another removable branch member.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
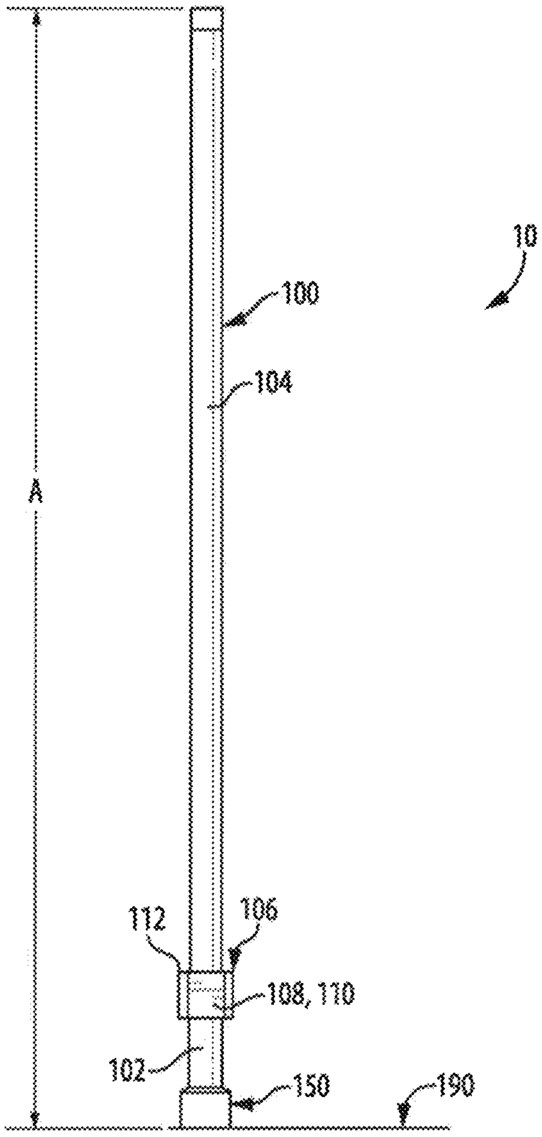
FIG. 1 illustrates an exemplary preferred embodiment of a tree/pole cutting training assembly and method.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Where a range of values is provided, it is understood that each intervening value, to the tenth of the unit of the lower limit unless the context clearly dictates otherwise, between the upper and lower limit of that range and any other stated or intervening value in that stated range is encompassed within the illustrated embodiments. The upper and lower limits of these smaller ranges may independently be included in the smaller ranges is also encompassed within the illustrated embodiments, subject to any specifically excluded limit in the stated range. Where the stated range includes one or both of the limits, ranges excluding either both of those included limits are also included in the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

In accordance with the below described exemplary illustrated embodiments, it is to be appreciated and understood described are embodiments facilitating a resilient outdoor training assembly that can be set up anywhere in the world with minimal impact to the environment where arboriculture, electric utility, and forestry workers can demonstrate the required skills necessary to conduct their job in a safe and consistent hands-on setting. Such an outdoor training facility is preferably configured to increase the safety of arboriculture, electric utility, and forestry workers during tree/utility pole felling/cutting exercises particularly by simulating work site conditions in a safe environment. An objective of the certain illustrated tree/utility pole felling/cutting training assemblies and methods is to provide to develop systematic and consistent training and assessment criteria, along with a standardized yard and engineered tree criteria, to conduct trainings and assessments with minimal environmental impact, preferably in accordance with international, national, state, and local regulations.

With reference now to FIG. 1, shown is a preferred embodiment of a tree felling/cutting training assembly depicted generally by reference numeral 10. Tree felling/cutting training assembly 10 includes an elongate pole member 100 defining a longitudinal axis "A" wherein the elongate pole member 100 has a base portion 102 and a separate elongate body portion 104. Tree felling/cutting training assembly 10 further includes a pole connecting member 106 configured and operable to removably secure to a top portion of the base portion 102 of the pole 100 and a bottom portion of the elongate body portion 104 of the pole 100 such that the base portion 102 and elongate body portion 104 are aligned in a common longitudinal axis "A". This configuration is particularly advantageous in that it enables the base portion 102 to be replaceable relative to the much larger elongate body portion 104 during repeated tree/pole felling/cutting training exercises consisting of cutting the base portion 102 of a pole member.

In a preferred embodiment, the pole connecting member 106 preferably defines an wall having a circular circumference whereby the pole connecting member 106 consists of separate interlocking first and second sleeve members 108, 110 each defining an annular wall surface configured to detachably secure to a top portion of the base portion 102 of the elongate pole member 100 and a bottom portion of the elongate body portion 104 when the first and second sleeve members 108,110 of the pole connecting member 106 are locked to one another. Preferably, a plurality of locking bolts 112 detachably lock/attach the first and second sleeve members 108, 110 to one another to form a locking collar about the top portion of the base portion 102 and a bottom portion of the elongate body portion 104 of the pole member 100.

Figure 2:
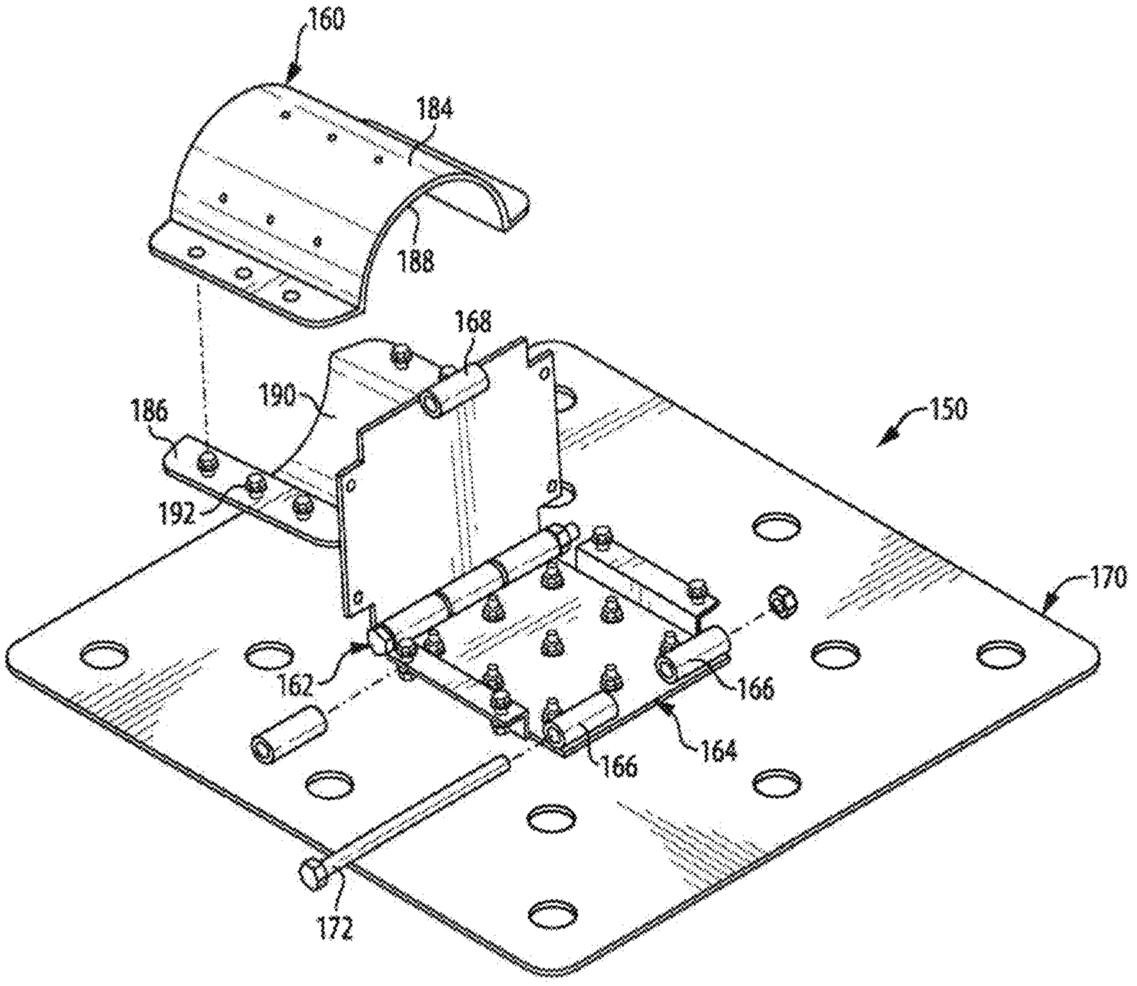
FIGS. 2 and 3 illustrate a preferred embodiment of a hinged base member used with certain embodiments of a tree/pole cutting training assembly and method.
Figure 3:
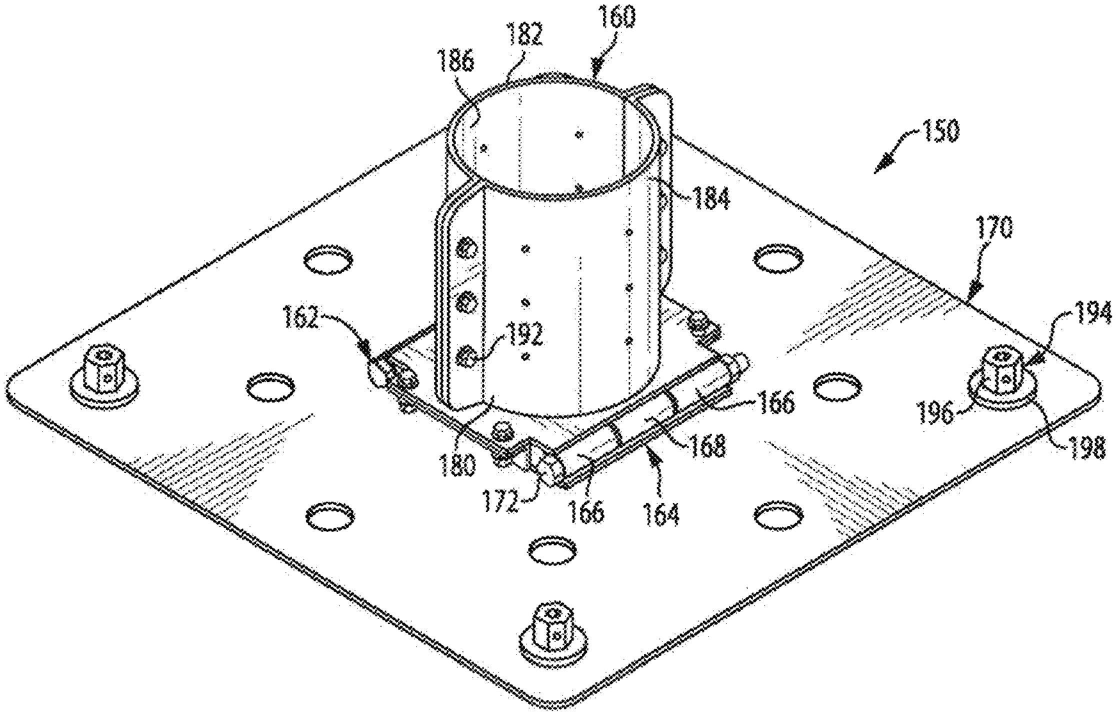

The tree cutting training assembly 10 of FIG. 1 further includes a base member 150 configured to removably secure to a bottom portion of the base portion 102 of the elongate pole member 100. In accordance with a preferred embodiment, the base member 150 is configured to pivot between first (FIG. 2) and second positions (FIG. 3), wherein the first position (FIG. 2) disposes the secured elongate pole member 100 substantially parallel to a ground plane 190 and the second position (FIG. 3) disposes the secured elongated pole member 100 at an angle relative to the ground plane 190, as shown in FIG. 1. With reference now to FIGS. 2 and 3 (and with continuing reference to FIG. 1), the base member 150 preferably includes a pole supporting member 160 pivotally coupled to a base plate 170 whereby the pole supporting member 160 pivots, preferably about a pivoting hinge assembly 162, at an approximate 90° orientation relative to the base plate 170 to facilitate the first (FIG. 2) and second positions (FIG. 3) provided by the base member 150 for a removably secured elongated pole member 100. A noted advantage of the base member 150 is that it safely hinges an elongated pole member 100 up and down relative to the ground 190 with the use of any suitable wrenching/pulley (and the like) mechanism while limiting side-to-side movement of the coupled elongate pole member 100.

In accordance with a preferred embodiment, the pivoting hinge assembly 162 pivotally couples the pole supporting member 160 to the base plate 170 (e.g., about a pivot pin). The pole supporting member 160 further includes a locking assembly 164 for locking the pole supporting member 160 in the second position (FIG. 3) whereby an elongate pole member 100 secured in the supporting member 160 upstands at an angle relative to the ground plane 190, as shown in FIG. 1. In accordance with a preferred embodiment, the locking assembly 164 preferably consists of a piano hinge assembly having inter-fitting cylinders 166,168 whereby a locking pin 172 is removably received in the inter-fitted cylinders 166,168 when the supporting member 160 is locked in its second position (FIG. 2). It is to be appreciated that while the depicted embodiments of FIGS. 1 and 3 illustrate the second positon of the supporting member 160 to retain a supported pole member 100 in a 90° angle relative to the ground plane 190, the tree cutting training assembly 10 is not to be understood to be limited thereto as the supporting member 160 is to be understood to be configured and operable to orient a supported pole member 100 at any acute angle relative to the ground plane 190 when secured in its second locking position via the locking assembly 164. For instance, the locking assembly 164 may include a jig member that extends between locking cylinders 166 and about locking cylinder 168, whereby locking pin 172 secures a first end of the jig member to the locking cylinders 166 and a second end of the jig member is secured about locking cylinder 168 via a separate locking pin. It is to be further appreciated the length (e.g., distance between the aforesaid first and second ends) of the jig member dictates the angle of orientation a supported pole member 100 is retained relative to the ground plane 190. As one skilled in the art would appreciate, trees and/or poles often are not disposed at a 90° angle relative to a ground plane 190, thus the aforesaid embodiment facilities a more accurate tree cutting training assembly 10 to which to train cutting a tree/pole disposed at an acute angle relative to the ground plane 190.

With continuing reference to FIGS. 2 and 3, the pole supporting member 160 preferably defines an upstanding wall 180 defining an open end preferably having a circular circumference 182. The pole supporting member 160 also preferably consists of separate interlocking first and second sleeve members 184,186 each defining an annular wall surface 188,190 configured to detachably secure about the bottom end portion of the base portion 102 of the pole member 100 when the first and second sleeve members 184, 186 are locked to one another (FIG. 3). A plurality of locking bolts 192 may be used for instance for detachably locking the first and second sleeve members 184,186 to one another, as shown in FIG. 3.

Figure 4:
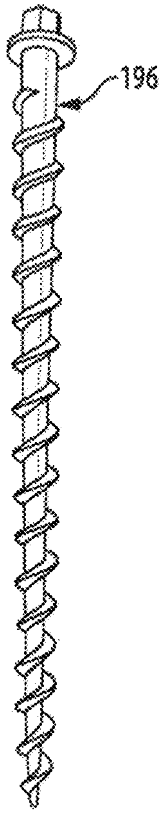
FIG. 4 illustrates an anchor bolt for securing the hinged base member of FIGS. 2 and 3 to ground top soil.

Additionally in accordance with the preferred embodiments of FIGS. 1-3, the base member 170 preferably includes a ground locking assembly 194 for detachably securing the base member 170 of the support member 160 to the ground plane 190. For instance, the ground locking assembly 194 may include a plurality of apertures 198 defined in the base plate 170 (FIG. 2) each being configured to removably receive an elongated anchor bolt 196 (FIGS. 3 and 4) for securing the base plate 170 to the ground plane 190. Preferably, each anchor bolt 196 is configured to mount the base plate 170 to ground top soil.

With regard to the composition of the pole member 100, it is to be appreciated the base portion 102 and separate elongate body portion 104 of the pole member 100 may be formed of a same material (e.g., wood) or may be formed of different materials relative to one another. For instance, the base portion 102 may be formed of oak wood while the elongate body portion may be formed of a less expensive material such as pine wood or a fabricated/composite material. Thus, this configuration enables training of cutting of oak material in the base portion 102 that is separate from the elongate body portion 104 when training of cutting an oak tree is required, hence only the smaller oak base portion 102 need to be replaced for each tree cutting training exercise. In other preferred embodiments, the base portion 102 may be consist of a material having a density different than the density of the material used in the separate elongate body portion 104. It yet other preferred embodiments, the outer circumference portion of the elongated pole member 100 may be fabricated from a wood material wherein in inner core portion is fabricated of a different material, including a non-wood material. For instance, the base portion 102 and separate elongate body portion 104 may be formed of different material, or same material relative to one, which material may consist of any suitable material, including (but not limited to: wood log from a tree; debarked non-treated wood utility pole; round wood timber; roundwood pylon; High density polyethylene (HDPE) pipe; fiberglass pole; steel pole with simulated wood surface; aluminum pole with simulated wood surface; square wood beam with laminated roundwood surface; and square metal beam with laminated roundwood surface.

Figure 5:
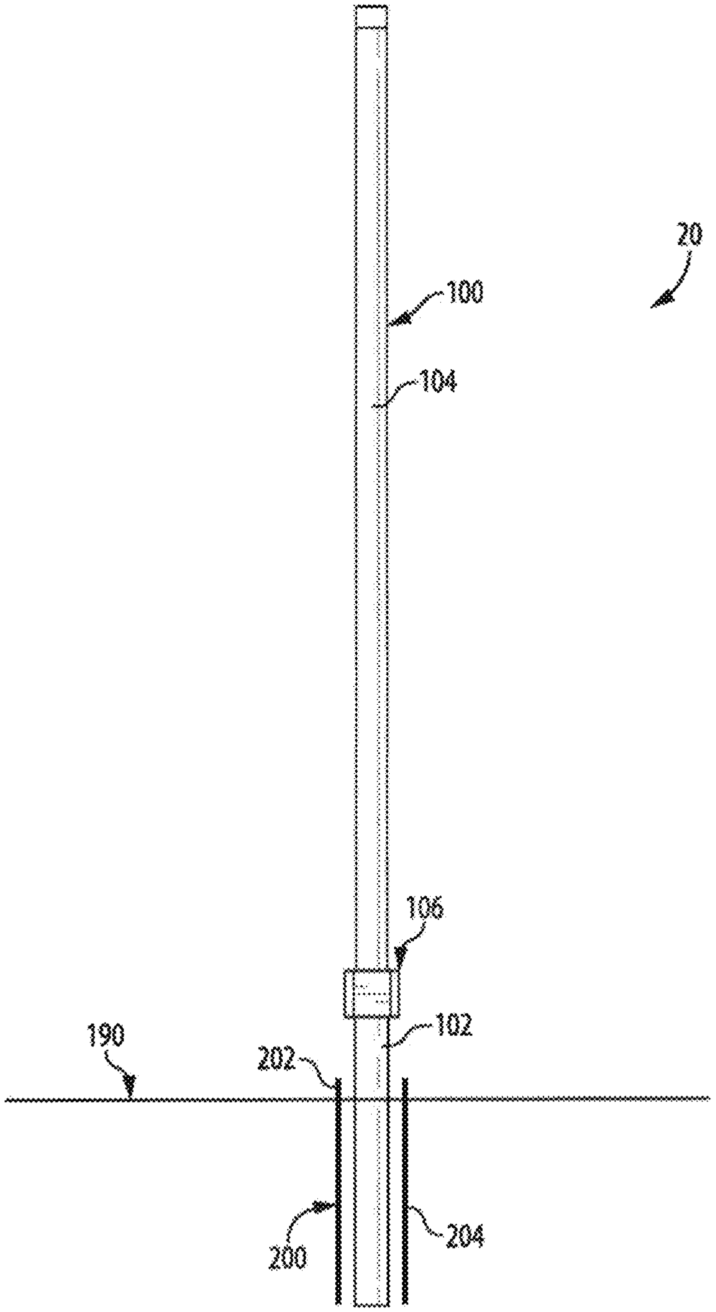
FIGS. 5-8 illustrate additional preferred embodiments of a tree/pole cutting training assembly and method.

With reference now to FIG. 5, shown is another preferred embodiment of a tree/pole cutting training assembly depicted generally by reference numeral 20. Tree/pole cutting training assembly 20 includes the elongate pole member 100 having its base 102 and body portion 104 coupled to one another via the connecting member 106 as described above with regard to the tree/pole cutting training assembly 10, as shown in FIG. 1. Thus, for ease of description, the description provided above for elongate pole member 100 having its base 102 and body portion 104 coupled to one another via the connecting member 106 is to be repeated and incorporated herein with regards to the tree cutting training assembly 20.

Tree cutting training assembly 20 differs from tree cutting training assembly 10 in that tree cutting training assembly 20 includes an elongate ground support member 200 for supporting an elongate pole member on the ground plane 190. The elongate ground support member 200 is preferably configured as an elongated sleeve open ended cylinder 202 operable to receive within an aperture/hole 204 formed in the ground 190. The open end 202 of the ground support member 200 preferably defines an inner receptacle portion 210 along its longitudinal axis configured to removably receive a bottom end portion of the base portion 102 of the elongated pole member 100 so as to support the elongate pole member 100 to upstand from the ground 190, as shown in FIG. 5. The elongate ground support member 200 may preferably be fabricated of any suitable material, such as a high density polyethylene (HDPE) pipe, metal pipe and the like.

It is to be appreciated that the tree/pole cutting training assembly 20 shown in FIG. 5, like tree/pole cutting training assembly 10 of FIG. 1, is particularly advantageous in that it enables the base portion 102 to be replaceable relative to the much larger elongate body portion 104 during repeated tree/pole cutting training exercises consisting of cutting the base portion 102 of a pole member 100.

Figure 6:
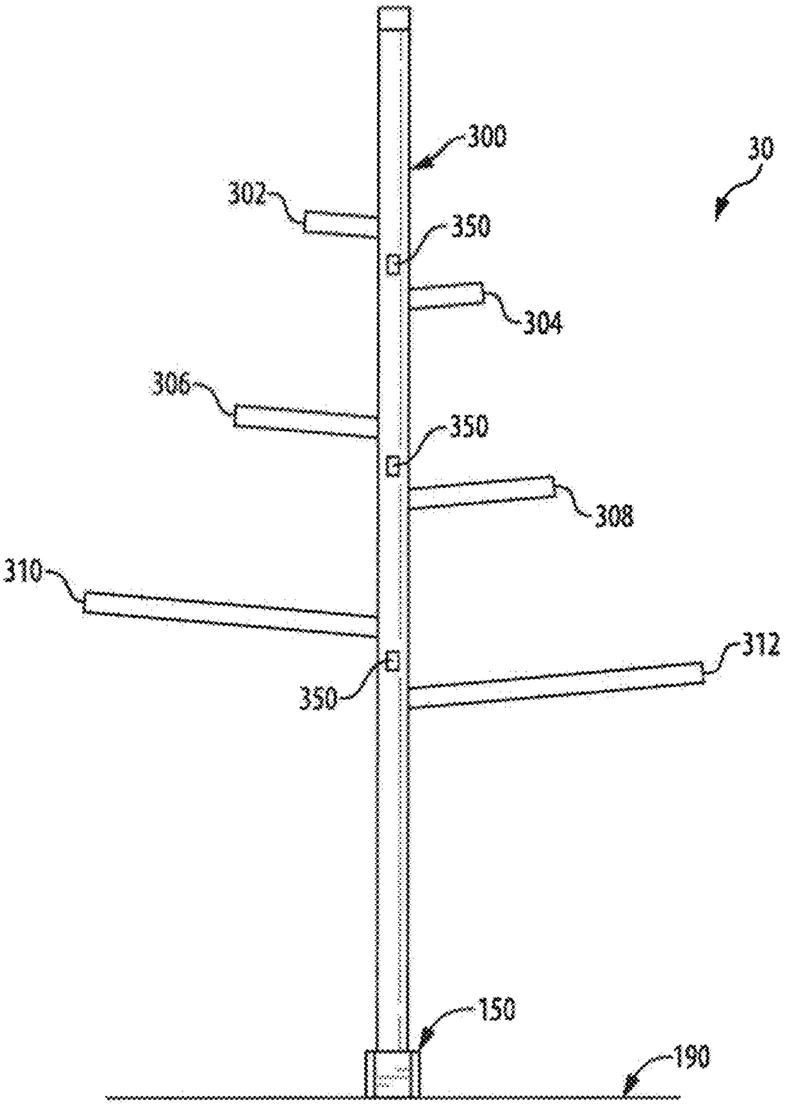

With reference now to FIG. 6, shown is another preferred embodiment of a tree/pole cutting training assembly depicted generally by reference numeral 30. Tree/pole cutting training assembly 30 includes an elongate pole member 300 having its bottom base 302 removably affixed in the base member 150. For ease of description, since the base member 150 is the same as base member 150 described above with regard to the tree/pole cutting training assembly 10, as shown in FIG. 1, the description provided above for base member 150 to be repeated and incorporated herein with regards to the tree cutting training assembly 30 of FIG. 6. In accordance with the preferred embodiment of FIG. 6, the elongate pole member 300 is preferably unitarily formed (hence no pole connecting member 106) and upstands from the base member 150 (as shown and described with reference to FIGS. 2 and 3). The elongated pole member 300 includes preferably a plurality of removable branch members 302-312 along its longitudinal axis. Each of the branch members 302-312 may have a different length extending angularly outward from the pole member 300 relative to one another. Preferably, an end portion of each branch member 302-312 removably receives within a respective aperture 350 formed at various locations along the longitudinal axis of the elongated pole member 300. In accordance with the preferred embodiment of FIG. 6, each of the removable branch members (302-312) is preferably fabricated from a wood material chosen to emulate a chosen tree type for branch cutting training. The elongated pole member 300 may be fabricated of a different material relative to the branches 302-312 suitable for training exercises. For instance, the branches 302-312 may be fabricated from costly oak wood material, while the pole member 300 is fabricated from wood/composite material different than oak, including (but not limited to) those described for fabrication of pole member 100 of tree/pole cutting training assembly 10 described above with reference to FIG. 1.

It is to be appreciated that tree/pole cutting training assembly 30 shown in FIG. 6, is particularly advantageous in that it enables branches 302-312 to be replaceable to facilitate tee branch training exercises.

Figure 7:
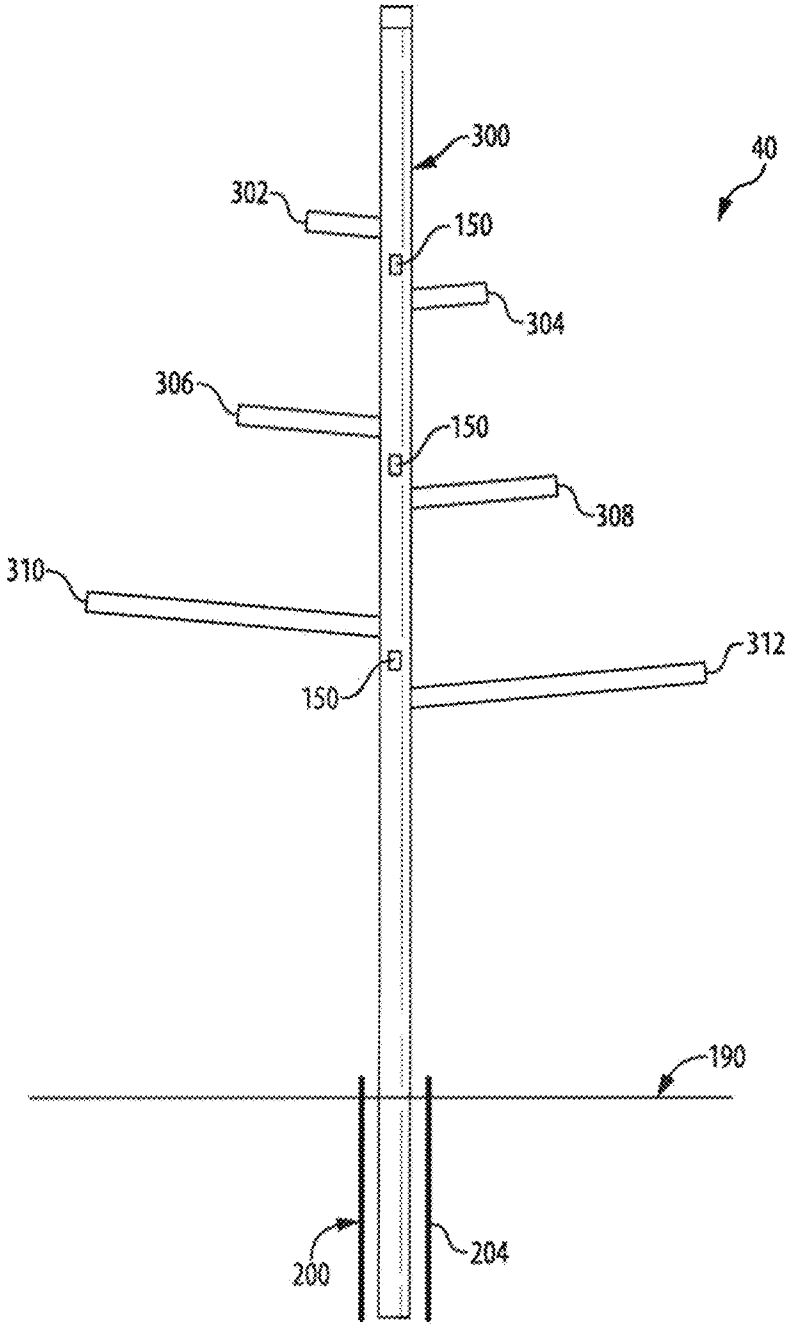

With reference now to FIG. 7, shown is another preferred embodiment of a tree/pole cutting training assembly depicted generally by reference numeral 40. Tree/pole cutting training assembly 40 includes the elongate pole member 300 having a plurality of removable branch members 302-312 as described above with regard to the tree/pole cutting training assembly 30, as shown in FIG. 6. Thus, for ease of description, the description provided above for elongate pole member 300 having a plurality of removable branch members 302-312 as described above with respect to FIG. 6, is to be repeated and incorporated herein with regards to the tree cutting training assembly 40 as shown in FIG. 7. Tree cutting training assembly 40 preferably differs from tree cutting training assembly 30 in that tree cutting training assembly 40 includes the elongate ground support member 200 for supporting an elongate pole member on the ground plane 190. For ease of description, the elongate ground support member 200 as described above with reference to FIG. 5 is repeated and incorporated herein with respect to the tree cutting training assembly 40 as shown in FIG. 7.

Figure 8:
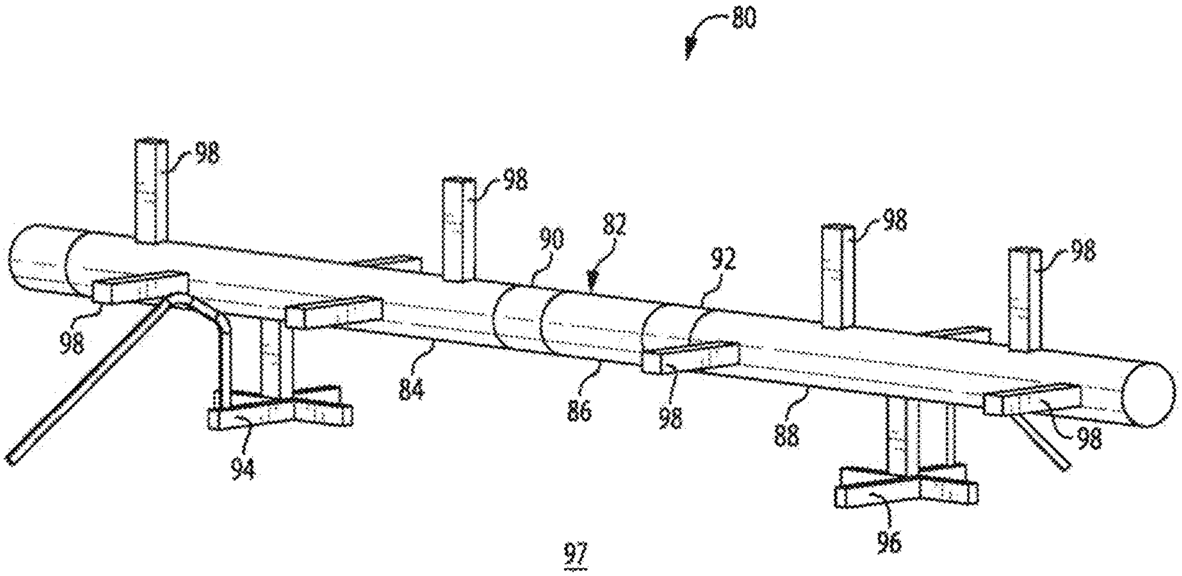

With reference now to FIG. 8, shown is another preferred embodiment of a tree/pole cutting training assembly depicted generally by reference numeral 80. Tree/pole cutting training assembly 80 preferably includes, once assembled, an elongated pole member 82 defining a longitudinal axis wherein the elongated pole member 82 consists of a plurality of separate body members (e.g., 84, 86 and 88). A plurality of pole connecting/coupling members (e.g., 90 and 92) are provided to detachably secure to an end portion of adjacent separate body members along the longitudinal axis of the elongated pole member 82 (as shown in FIG. 8) so as to couple the plurality of separate body members (e.g., 84, 86 and 88) to one another. It is to be appreciated that for ease of illustration, pole member 82 is shown in FIG. 8 to include three separate body members 84, 86 and 88, each detachably connected/coupled to one another via connecting/coupling members 90 and 92. However, the pole member 82 of training assembly 80 is not to be understood to be limited to what is illustrated in FIG. 8 as training assembly 80 is to be understood to include any plurality of separate body members and connecting/coupling members suitable for an intended purpose. And for ease of description, the description provided above for pole members 102 and 104 in the embodiment of FIG. 1, is to be repeated and incorporated herein with regards to the separate body members 84, 86 and 88.

With regard to the connecting/coupling members 90 and 92 of tree/pole cutting training assembly 80, they may consist of any suitable connecting/coupling members for detachably coupling adjacent ends of pole members (e.g., 84, 86) in proximity to, or adjacent one another, as shown in FIG. 8, including (but not limited to) coupling member 106 of FIG. 1.

As shown in FIG. 8, the tree/pole cutting training assembly 80 further preferably includes a plurality of support members (e.g., 94 and 96) each configured to preferably support the elongated pole member 80 in a plane that is substantially horizontal to a supporting surface plane 97 (e.g., a ground surface). While pole member 82 is shown disposed substantially horizontal to the supporting surface plane 97 in FIG. 8, pole member 80 is not to be limited to being supported substantially horizontal to the supporting surface plane 97, as the support members (e.g., 94 and 96) may be configured to support pole member 80 at a user desired angle relative to its supporting surface plane 97.

As shown and described above in FIG. 6 with regard to tree/pole cutting training assembly 300, tree/pole cutting training assembly 80 may also preferably include a plurality of removable branch members 97. For ease of description, the description provided above for removable branch members 302-312 of tree/pole cutting training assembly 300. FIG. 6, is to be repeated and incorporated herein with regards to the plurality of removable branch members 97 of tree/pole cutting training assembly 80 of the illustrated embodiment of FIG. 8.

Figure 9:
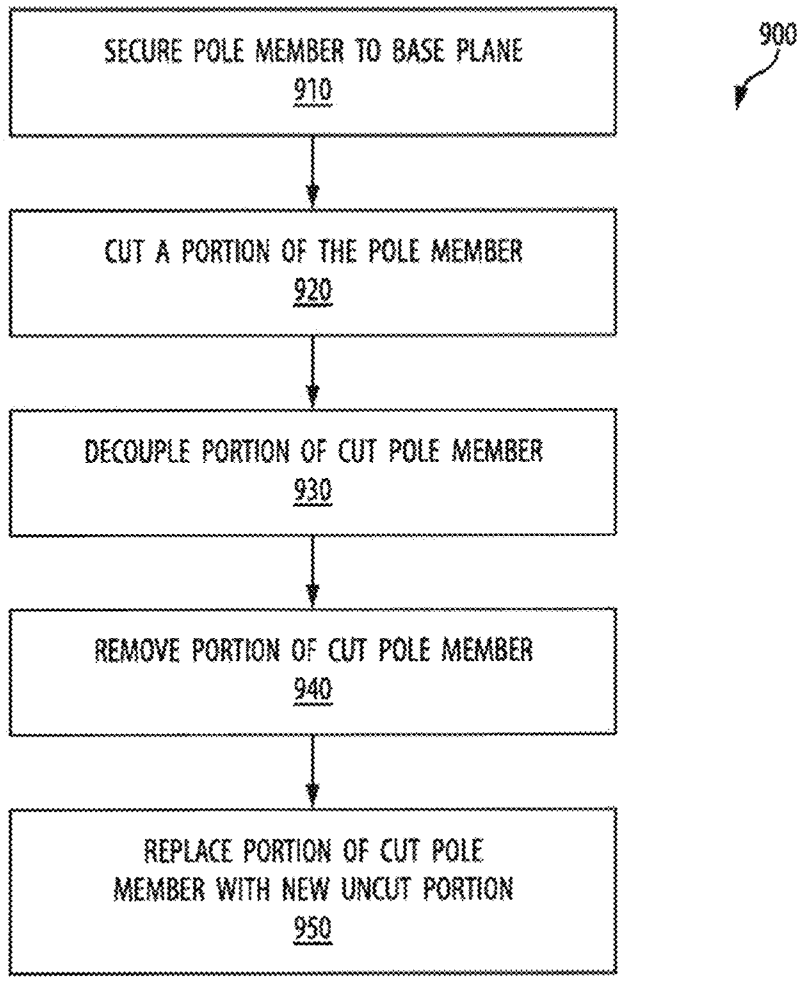
FIG. 9 illustrates a flowchart depicting an exemplary tree cutting process utilizing one or more of the embodiments of FIGS. 1-8.

With certain illustrated embodiments described above, and with reference now to FIG. 9, shown is a flow chart demonstrating an illustrative tree cutting process 900 utilizing one or more of the exemplary embodiments of FIGS. 1-8. It is noted that the order of steps shown in FIG. 9 is not required, so in principle, the various steps may be performed out of the illustrated order. Also certain steps may be skipped, different steps may be added or substituted, or selected steps or groups of steps may be performed in a separate application following the embodiments described herein.

Starting at step 910, (and with reference to the exemplary embodiment of FIG. 1), an elongated pole member 100 is detachably secured in a base securing member 150 affixed to a ground plane 190 such that elongated pole member 100 upstands from the ground plane 190. In the exemplary embodiment of FIG. 1, the elongated pole member 100 preferably includes a first base portion 102 defining a bottom portion of the elongated pole member 100 wherein a bottom end of the first base portion 102 is detachably secured in the base securing member 150. The elongated pole member 100 further includes a separate coupled elongated body portion 104 defining a top portion of the elongated pole member 100 wherein a bottom end the elongated body portion 104 is detachably coupled to a top end of the first base portion 102 via a pole coupling assembly 106 (as described in detail above). Next, at step 920, a user cuts at least portion of the base portion 102 of the elongated pole member 100 extending from the base securing member 150. It is to be appreciated (and as also described above), this is particularly advantageous in that it enables the base portion 102 to be replaceable relative to the much larger elongate body portion 104 during repeated tree/pole cutting training exercises consisting of cutting the base portion 102 of a pole member.

Once the base member 102 is cut (step 920), the elongated body portion 104 is decoupled so as to be separated from the cut base portion 102 of the pole member 100 (step 830), preferably via disassembly and/or removal of the pole coupling assembly 106, step 830. Next, at step 940, the base portion 102 is decoupled so as to be separated from the base securing member 150. It is to be appreciated that steps 930 and 940 may be interchangeable with one another.

Once the aforesaid cut/severed base portion 102 has been decoupled and separated from each of the pole coupling assembly 106 (step 930) and base securing member 150

(step 940), a new (e.g., uncut) base member 102 is then secured to both the pole coupling assembly 106 and base securing member 150 through repetition of step 910 such that method 900 may be practiced again for tree cutting training purposes.

It is to be appreciated that the process for cutting a tree is not to be limited to what is described above with regard to process 900, as that is only provided for exemplary illustrative process. For instance, the process 900 may include tree cutting training on the elongated pole member 104 (in contrast to the base member 102), or it may include tree cutting training on both the base member 102 and the elongated pole member 104. And it may further include training regarding the cutting of one or more removable branch members (e.g., 302) as also described above.

With the certain preferred embodiments being described above, it is to be appreciated each is advantageous in that provided is an assembly and method for tree/pole cutting training. For instance, when utilizing the hinged base member 150, provided is a training assembly that provides the lowering of a training pole member to easily and safely replace lateral limbs and/or vertical wood sections of a pole member to effectively improve worker safety and security by performing tree/pole training tasks from the ground, rather than having to perform such tasks at height thereby minimizing workers' risk exposure to a fall hazard. Further, the securement of a base plate via the ground anchors, combined with the hinged capabilities of the pole and the sustainability of using reusable and replaceable components is particularly advantageous for training and assessing arborists, forestry, and utility trade workers.

With certain illustrated embodiments described above, it is to be additionally appreciated that various non-limiting embodiments described herein may be used separately, combined or selectively combined for specific applications. For instance, embodiments may include one or more of: a pole member positioned perpendicular to the ground plane having a replaceable base portion; a pole member positioned perpendicular to the ground plane having a replaceable top portion; a pole member positioned perpendicular to the ground plane having a replaceable top portion and including replaceable branch members; a pole member positioned parallel to the ground plane having a one or more replaceable portions; two pole members positioned parallel to the ground plane having a replaceable center portion disposed between each pole member; two pole members positioned parallel to the ground plane having a replaceable center portion disposed each pole member further including replaceable branch members; and two pole members positioned parallel to the ground plane having a replaceable center portion affixed to a spring member.

Figure 10A:
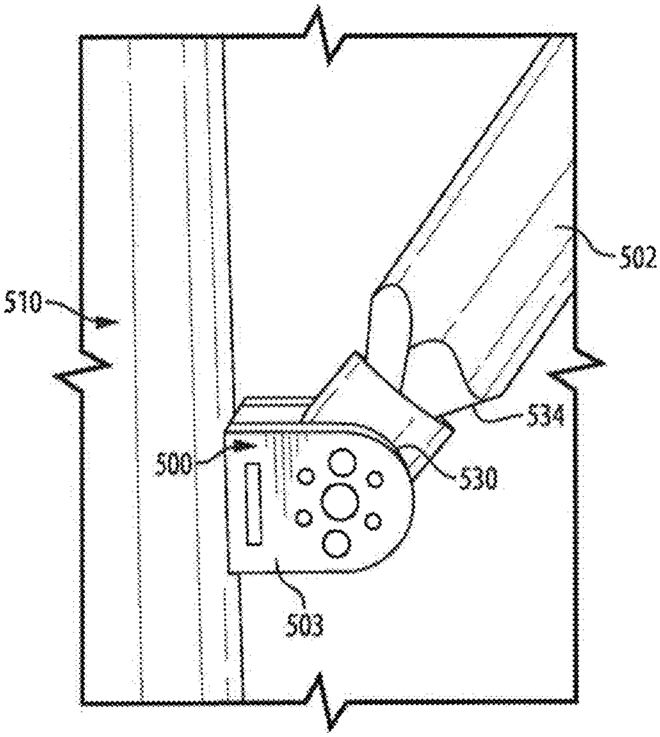
FIGS. 10A and 10B illustrate respective embodiments of a branch connection assembly that may be used with one or more of the embodiments of FIGS. 1-8.
Figure 10B:
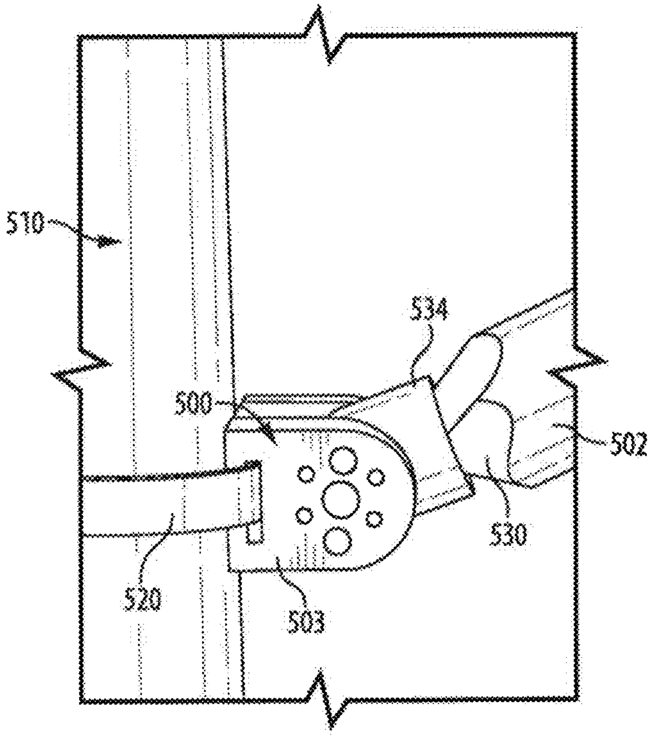

Further, some of the various features of the above non-limiting embodiments may be used without the corresponding use of other described features. For instance, depicted in FIGS. 10A and 10B is an articulating branch connection assembly 500 which is configured to detachably engage with a branch member 502. The branch connection assembly 500 preferably includes a base portion 503 that is affixed to a pole 510 through any suitable affixation means, including (but not limited to) one or more mounting bolts (not shown) that pass through the base portion 503 into the body portion of the pole 510 member (as shown in FIG. 10A), or via a ratchet strap fastener assembly 520 that fastens the base portion 503 to the outer circumference portion of the pole member 510 (as shown in FIG. 10B). The connection assembly 500 preferably further includes a branch connection component 530 that is preferably pivotally mounted to the base member 503. The branch connection component 530 has an open end portion 534 configured to detachably secure to end portion of a branch member 502. The branch connection component 530 is preferably configured to be pivotally adjusted relative to the base member 503 such that a detachably mounted branch member 502 may be affixed in user desired position within a 180° angle of orientation relative to the plane of the pole member 510.

The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A chainsaw cutting training assembly, comprising:

an elongated pole member defining a longitudinal axis wherein the elongated pole member has a base member defining a bottom portion of the elongated pole member and a separate body member defining a top portion of the elongated pole member;

a pole connecting member configured to removably secure to a top portion of the base member and a bottom portion of the body member of the elongated pole member such that the base member and body member are aligned along a common axis; and a base securing member having a ground locking assembly for detachably securing the base securing member to a ground plane, the base securing member being configured to detachably secure to the bottom portion of the base member of the elongate pole member such that base member upstands from the ground plane, wherein the base member is formed of wood configured to be cut by a chainsaw during training exercises, wherein the base member is configured to be severed from the body member during a tree cutting training exercise, and wherein the pole connecting member enables replacement of the severed base member with a new base member while retaining the body member.

2. The tree cutting training assembly as recited in claim 1, wherein the base member and separate body member of the elongate pole member are formed of different materials relative to one another.

3. The tree cutting training assembly as recited in claim 2, wherein the base member is formed of wood.

4. The tree cutting training assembly as recited in claim 2, wherein the base member has a material density different than the material density of the separate body member.

5. The tree cutting training assembly as recited in claim 1, wherein the body member of the pole member includes a plurality of removable branch members.

6. The tree cutting training assembly as recited in claim 5, wherein the removable branch members are fabricated from a material different than the material used to fabricate the body member.

7. The tree cutting training assembly as recited in claim 5, wherein each of the plurality of removable branch members extends angularly from a section of the body member along the longitudinal axis of the elongated pole member, whereby each branch member removably engages with a branch receiving section defined on a portion of the body member.

8. The tree cutting training assembly as recited in claim 5, wherein each branch receiving section of the body member is defined by an aperture formed in the body member configured to detachably receive an end portion of a removable branch member.

9. The tree cutting training assembly as recited in claim 1, wherein the pole connecting member defines a wall having a circular circumference whereby the pole connecting member consists of separate interlocking first and second sleeve members each defining an annular wall surface configured to detachably secure to a top portion of the base member of the elongate pole member and a bottom portion of the body member when the first and second sleeve members are engaged with one another.

10. The tree cutting training assembly as recited in claim 1, wherein the base securing member includes an elongate ground support member configured to receive within the ground, wherein the elongate ground support member defines an inner receptacle portion along its longitudinal axis configured to removably receive a bottom end portion of the base member of the elongated pole member so as to support the elongate pole member to upstand from the ground.

11. The tree cutting training assembly as recited in claim 1, wherein the base member is configured to pivot relative to the ground plane, wherein a first position disposes the secured elongate pole member substantially parallel to a ground plane and a second position disposes the secured elongated pole member at an angle relative to the ground plane.

12. The tree cutting training assembly as recited in claim 11, wherein the base member consists of a pole supporting member pivotally coupled to a base plate whereby the pole supporting member pivots at an angle relative to the base plate to facilitate angular affixation of the elongated pole member relative to the ground plane and wherein the pole supporting member includes a hinge assembly pivotally coupling the pole supporting member to the base plate.

13. The tree cutting training assembly as recited in claim 12, wherein the pole supporting member further includes a locking assembly for locking the pole supporting member in an angular position whereby an elongate pole member secured in the supporting member upstands at an angle relative to the ground plane, wherein the angle relative to the ground plane is user selectable.

14. A chainsaw cutting training method, comprising:

detachably securing an elongated pole member in a base securing member affixed to a ground plane such that elongated pole member upstands from the ground plane, wherein the elongated pole member includes: 1) a first base portion defining a bottom portion of the elongated pole member wherein a bottom end of the first base portion is detachably secured in the base securing member; and 2) a separate coupled elongated body portion defining a top portion of the elongated pole member wherein a bottom end the elongated body portion is detachably coupled to a top end of the first base portion, and wherein the first base portion is formed of wood configured to be cut by a chainsaw during training exercises;

cutting at least portion of the first base portion of the elongated pole member extending from the base securing member;

decoupling the elongated body portion from the first base portion of the pole member after the at least a portion of the first base portion was cut;

removing the first base portion from the base securing member after the at least a portion of the first base portion was cut; and coupling the elongated body portion to a second base portion so as to form a new elongated pole member.

15. The tree cutting method as recited in claim 14, further including detachably securing the new elongated pole member in the base securing member.

16. The tree cutting method as recited in claim 14, wherein a pole connecting member is removably secured to the top end of the first base portion and the bottom end of the elongated body portion of the elongated pole member such that the first base portion and elongated body portion are aligned along a common axis.

17. The tree cutting method as recited in claim 14, wherein a plurality of branch members are removably secured to the elongated body portion of the pole member such that after a branch member is cut, it is removed from the elongated body portion and replaced with another removable branch member.

* * * * *